United States Patent
Lew et al.

(10) Patent No.: US 12,049,027 B2
(45) Date of Patent: Jul. 30, 2024

(54) METHOD FOR PRODUCING JEWELRY FROM HUMAN MILK AND AN EPOXY RESIN

(71) Applicant: MILKIES SPOLKA AKCYJNA, Szczecin (PL)

(72) Inventors: Katarzyna Lew, Szczecin (PL); Grzegorz Wojtowicz, Szczecin (PL)

(73) Assignee: Katarzyna Lew, Szczecin (PL)

( * ) Notice: Subject to any disclaimer, the term of this patent is extended or adjusted under 35 U.S.C. 154(b) by 275 days.

(21) Appl. No.: 17/767,440

(22) PCT Filed: Jun. 25, 2020

(86) PCT No.: PCT/EP2020/067972
§ 371 (c)(1),
(2) Date: Apr. 8, 2022

(87) PCT Pub. No.: WO2021/069114
PCT Pub. Date: Apr. 15, 2021

(65) Prior Publication Data
US 2023/0072398 A1    Mar. 9, 2023

(30) Foreign Application Priority Data
Oct. 8, 2019  (EP) .................................... 19202098

(51) Int. Cl.
| B29C 39/00 | (2006.01) |
| A44C 27/00 | (2006.01) |
| B29C 39/38 | (2006.01) |
| B29C 39/42 | (2006.01) |
| C08G 59/50 | (2006.01) |
| C08G 59/68 | (2006.01) |
| C08K 13/08 | (2006.01) |
| C08L 63/00 | (2006.01) |
| B29K 63/00 | (2006.01) |
| B29L 31/00 | (2006.01) |
| C08K 5/17 | (2006.01) |
| C08K 5/37 | (2006.01) |
| C08K 11/00 | (2006.01) |

(52) U.S. Cl.
CPC .......... *B29C 39/003* (2013.01); *A44C 27/001* (2013.01); *B29C 39/38* (2013.01); *B29C 39/42* (2013.01); *C08G 59/50* (2013.01); *C08G 59/687* (2013.01); *C08K 13/08* (2013.01); *C08L 63/00* (2013.01); *B29K 2063/00* (2013.01); *B29K 2995/0026* (2013.01); *B29L 2031/743* (2013.01); *C08K 5/175* (2013.01); *C08K 5/37* (2013.01); *C08K 11/00* (2013.01)

(58) Field of Classification Search
None
See application file for complete search history.

(56) References Cited

U.S. PATENT DOCUMENTS

2019/0343139 A1*  11/2019  Snow .................. A23C 9/1427

FOREIGN PATENT DOCUMENTS

| CN | 105124873 A | 12/2015 |
| CN | 106263317 A | 1/2017 |
| CN | 107160935 A | 9/2017 |
| CN | 110003445 A | 7/2019 |
| ES | 1227094 U | 3/2019 |

OTHER PUBLICATIONS

Resin Obsession, Breastmilk jewelry?, available at https://www.resinobsession.com/forums/topic/breastmilk-jewelry/, Mar. 18, 2015 (Year: 2015).*
Martin B. Williamson: "The Amino Acid Composition of Human Milk Proteins"; Jul. 8, 1944; XP055678089.

* cited by examiner

*Primary Examiner* — Yung-Sheng M Tsui
(74) *Attorney, Agent, or Firm* — Andrzej Malarz, Esq.

(57) ABSTRACT

A method for producing jewelry from human milk and an epoxy resin involving mixing human milk with a transparent epoxy resin, placing it in the mold and allowing it to harden, in which an epoxy resin and an amine hardener are used, wherein a quantity of cysteine and/or serine equal to at least 0.1 percent by weight of the milk is first added to human milk and the resulting mixture is introduced into the mixture of an epoxy resin with an amine hardener in an amount between 0.1 percent and 40 percent by volume of the mixture of an epoxy resin and a hardener.

8 Claims, No Drawings

METHOD FOR PRODUCING JEWELRY FROM HUMAN MILK AND AN EPOXY RESIN

The subject of the invention is a method for producing jewelry from human milk and an epoxy resin.

Jewelry is made from mother's milk during breastfeeding period. Jewelry can take various shapes and sizes, for instance a shape of a sphere with a diameter of 2-20 mm. It can also be enclosed within any jewelry item. Due to the fact that jewelry may be used daily, and is designed to last for years, it must be resistant to a variety of chemical substances, e.g: sweat, detergents, cosmetics; as well as physical factors: temperature, solar radiation, UV radiation.

The Chinese patent application CN107160935A introduced a method for storing human milk permanently. In this solution, human milk is mixed with resin, and the product resulting from this process may take the form of jewelry.

Another Chinese patent application CN105124873A introduced a method for producing decorative elements from human milk which includes, among others, combining human milk with an epoxy resin, wherein before combining the milk with the resin, the human milk is poured into a small beaker which is placed under an alcohol lamp and heated at a temperature of 400-500° C. for 5-10 minutes until viscous.

The Chinese patent application CN106263317A introduced yet another method for producing jewelry from human milk using resin in which the human milk is placed into a vacuum-closed mold made from resin.

Further, the Spanish utility model ES1227094U describes a method for producing jewelry from human milk by mixing human milk in a transparent epoxy resin. In this method, human milk is processed into a powder, and then combined with resins.

The methods for producing jewelry described above, which involve adding human milk to an epoxy resin, mixing it and then pouring it into a mold, have one major flaw: the obtained product changes its color from white to brown. This change of color is caused by the Maillard reaction, which is a reaction between amino groups and sugars and the products of this reaction change the color of milk from yellow through slightly brown to brown. This process is even more evident when sterilizing milk at a temperature of approximately 135° C. or higher. During this process, milk's properties deteriorate due to the Maillard reaction, as a result of which the products of this reaction change the color of milk from yellow through slightly brown to brown. Additionally, unsaturated fatty acids are oxidized to aldehydes, which is demonstrated by a characteristic unpleasant smell.

Thus far, producing jewelry while obtaining a homogenous milky-white color which would not change over time has remained an unsolved problem. The existing products change their colour within a few or more weeks of their manufacture. The rate of color change and the final color (shades of yellow and brown) depend mainly on the composition of milk, and more specifically on the content of sugars, amino acids, fatty acids, epoxy resin hardeners (especially amine), as well as external conditions, with temperature being the most important. Typically, these components accelerate the Maillard reaction significantly.

The purpose of the invention was to develop a method for making jewelry by mixing human milk in an epoxy resin without affecting the mechanical and chemical properties of the epoxy resin, but maintaining the appearance and color of the produced jewelry in the long term without the need to use dyes.

The method for making jewelry from human milk and an epoxy resin according to the present invention which involves mixing human milk with a transparent epoxy resin, placing it in a mold and allowing to harden, is unique in that an epoxy resin with an amine hardener is used, wherein a quantity of cysteine and/or serine equal to at least 0.1% by weight of the milk is first added to human milk, and the resulting mixture is introduced into the mixture of an epoxy resin with an amine hardener in an amount between 0.1 percent to 40 percent by volume of the mixture of an epoxy resin and a hardener.

Optimally, sodium bisulfate (IV) is added to the milk in an amount equal to at least 0.1 percent by weight of the milk before adding milk to the mixture of an epoxy resin and an amine hardener.

It is beneficial, before adding milk to the mixture of an epoxy resin and an amine hardener, to add to it an emulsifier in the amount of between 0.1 percent and 75 percent by weight of the milk, preferably sodium polyacrylic acid.

The process is best carried out at a temperature of between 15 to 50° C., as at higher temperatures (above 50° C.) the hardness of the product begins to decrease, which is inferior given the risk of mechanical damage to the finished product.

It is recommended that the process of preparing a mixture of milk and additives with a mixture of an epoxy resin and an amine hardener be carried out together with the addition of a dispersant in an amount between 0.1 percent and 50 percent by volume of the mixture of an epoxy resin and hardener, preferably ethoxylated castor oil being used as the dispersant.

Additionally, the process of hardening an epoxy resin is optimally carried out at a pressure of between 0.5 and 50 bars, preferably using an autoclave into which the mold is inserted after being filled, which by preventing the formation of air bubbles makes it easier to obtain a homogeneous structure of the finished product and reduces the rate of aging processes.

The method according to the invention makes production of jewelry possible by mixing human milk in an epoxy resin at ambient temperature, without compromising the mechanical or chemical properties of the epoxy resin, while maintaining the appearance and color of the produced jewelry over time.

In the method according to the invention, the use of cysteine (a racemic mixture or pure L or D enantiomer), serine, or a mixture thereof affects the Maillard reaction. The introduced amino acid (single or in the form of a mixture) reacts faster with the carbonyl groups of sugars than amino groups which naturally occur in milk as amino acids and proteins, and amino groups introduced in large quantities in the form of an epoxy resin hardener. The products obtained in the method according to the invention have a white or slightly beige color. In order to obtain a homogeneous, milky white color, sodium bisulfate (IV) is used in the form of an aqueous solution or a loose powder.

The use of preservatives and/or antioxidants of unsaturated fatty acids may cause delamination of milk. In order to avoid this undesirable process, an emulsifier is used, preferably sodium acid polyacrylic.

The use of a dispersant makes it easier to obtain a homogeneous mixture of milk in an epoxy resin.

In the method according to the invention, a transparent epoxy resin is prepared following the manufacturers' recommendations, most commonly it is mixed with an amine hardener at a weight ratio of two to one. To make jewelry, molds with a casting volume between 0.01 and 200 cm$^3$ are typically used. The mold and the casting are left until the resin hardens, usually after between 0.5 and 48 hours.

The method according to the invention is illustrated by the following examples:

EXAMPLE 1

0.0083 g cysteine, 0.0167 g serine and 0.0088 g sodium bisulfate (IV) were added to an 8 g milk sample and then mixed. Then, 1 ml of a milk mixture with additives was added to 10 ml of a mixture of a transparent epoxy resin and an amine hardener. The whole was mixed, poured into a mold with a casting volume of 1.1 cm$^3$ and left until hardening of the resin. A milky white ball-shaped cast was obtained.

Upon completing this process, the casting was transferred to the aging chamber and left for 24 hours at 70° C. After the aging process, no changes in the color or shape of the ball were observed.

EXAMPLE 2

0.0158 g cysteine and 0.1682 g sodium bisulfate were added to a 5 g milk sample, and then mixed. Then 1.8 ml of a milk mixture with additives was added to 10 ml of the prepared mixture of a transparent epoxy resin and an amine hardener. The product was mixed, poured into a mold with a casting volume of 1.1 cm$^3$ and placed in an autoclave for a period of 48 hours at a pressure of 0.5 bars. The temperature in the autoclave was constant at 15° C. A milky white ball-shaped cast was obtained.

Upon completing this process, the casting was transferred to the aging chamber and left for 24 hours at 70° C. After the aging process, no changes in the color or shape of the ball were observed.

EXAMPLE 3

0.2031 g serine and 0.1985 g sodium bisulfate were added to a 10 g milk sample, and then mixed. Then 9 ml of a milk mixture with additives was added to 50 ml of the prepared mixture of a transparent epoxy resin and an amine hardener. The product was mixed, poured into a mold with a casting volume of 39 cm$^3$ and placed in an autoclave for a period of 0.5 hours at a pressure of 50 bar. The temperature in the autoclave was constant at 50° C. A milky white mold in the shape of a mother's figurine was obtained.

Upon completing the process, the casting was transferred to the aging chamber and left for 24 hours at 70° C. After the aging process, no changes in the color or shape of the mother's figurine were observed.

EXAMPLE 4

0.0531 g cysteine and 0.9952 g serine were added to a 4 g milk sample, and then mixed. Then 1 ml of a milk mixture with additives was added to 10 ml of the prepared mixture of a transparent epoxy resin and an amine hardener. The product was mixed, poured into a mold with a casting volume of 4.7 cm$^3$ and left hardening of the resin. A white ball-shaped cast was obtained.

Upon completing this process, the casting was transferred to the aging chamber and left for 24 hours at 70° C. After the aging process, no changes in the color or shape of the ball were observed.

EXAMPLE 5

1.0247 g serine and 0.9974 g sodium bisulfate (IV) were added to a 15 g milk sample, 8.5227 g cysteine, and then mixed. Then, 15 ml of a milk mixture with additives was added to 200 ml of the prepared mixture of a transparent epoxy resin and an amine hardener. The product was mixed, poured into a mold with a casting volume of 180 cm$^3$ and left until the resin hardened. A milky white figurine-shaped cast was obtained.

Upon completing the process, the casting was transferred to the aging chamber and left for 24 hours at 70° C. After the aging process, no change in the color or shape of the figurine was observed.

EXAMPLE 6

0.0011 g cysteine, 0.0050 g serine and 0.0081 g sodium bisulfate (IV) were added to a 10 g milk sample, and then mixed. Then 2 ml of the milk mixture with additives was added to 15 ml of the prepared mixture of a transparent epoxy resin and an amine hardener. The product was mixed, poured into a mold with a casting volume of 4 cm$^3$ and left until hard. No changes in color or shape were observed. A milky white statuette-shaped cast was obtained.

Upon completing the process, the casting was transferred to the aging chamber and left for 24 hours at 70° C. After the aging process, no changes in the color or shape of the statuette were observed.

EXAMPLE 7

0.0357 g of serine was added to a 10 g milk sample, and then mixed. Then 3.5 ml of a milk mixture with additives was added to 10 ml of the prepared mixture of a transparent epoxy resin and an amine hardener. The product was mixed, poured into a mold with a casting volume of 4 cm$^3$ and left until the resin hardened. A white casting was obtained in the form of a filling.

Upon completing the process, the casting was transferred to the aging chamber and left for 24 hours at 70° C. After the aging process, no changes in the color or shape of the filling were observed.

EXAMPLE 8

2.5057 g cysteine was added to a 5 g milk sample. Then, 3 ml of a milk mixture with additives was added to 10 ml of the prepared mixture of a transparent epoxy resin and an amine hardener. The product was mixed, poured into a mold with a casting volume of 4 cm$^3$ and left until hard. No changes in color or shape were observed. A white diamond-shaped cast was obtained.

Upon completing the process, the casting was transferred to the aging chamber and left for 24 hours at 70° C. After the aging process, no changes in the color or shape of the diamond were observed.

EXAMPLE 9

The following were added to a milk sample of 8 g: 0.1154 g of preservative (comprising phenoxyethanol 52.2%, caprylic glycol 42.1%, sorbic acid 6.1%), 0.0083 g cysteine, 0.8442 g sodium salt polyacrylic acid, 0.1017 g of unsaturated fatty acid antioxidant in the form of butylated hydroxytoluene BHT and 0.0088 g of sodium bisulfate (IV) and mixed. 1 ml of a milk mixture dropwise with additives and 0.025 ml of ethoxylated castor oil were added to the prepared mixture of a transparent epoxy resin and an amine hardener, with a volume of 10 ml. The whole was mixed, poured into a silicone mold with a casting volume of 1.1 cm$^3$ and placed in an autoclave for a period of 36 hours at a pressure of 15 bars. The temperature in the autoclave was kept constant at 15° C. Upon completing the process, the casting was transferred to the aging chamber for a period of 24 hours at 70° C. No changes in color or shape were observed. A milky white ball-shaped cast was obtained.

EXAMPLE 10

The following were added to a milk sample of 5 g: 0.5347 g of a preservative (comprising phenoxyethanol 52.2%, caprylic glycol 42.1%, sorbic acid 6.1%), 0.0158 g cysteine, 0.1483 g sodium acid polyacrylic, 0.11174 g BHA and 0.1682 g sodium bisulfate (IV) and the whole was mixed. 1.8 ml of a milk mixture dropwise with additives and 0.8 ml of ethoxylated castor oil were added to the prepared mixture of a transparent epoxy resin and an amine hardener, with a volume of 10 ml. The substances were mixed, poured into a silicone mold with a casting volume of 1.1 cm$^3$ and placed in an autoclave for a period of 24 hours at a pressure of 20 bar. The temperature in the autoclave was constant at 35° C. Upon completing the process, the casting was transferred to the aging chamber for a period of 24 hours at 70° C. No changes in color or shape were observed. A milky white ball-shaped cast was obtained.

The invention claimed is:

1. A method of producing jewelry from human milk and an epoxy resin involving mixing human milk with a transparent epoxy resin, placing it in a mold and allowing it to harden, characterized in that an epoxy resin with an amine hardener is used, wherein a quantity of cysteine and/or serine equal to at least 0.1% by weight of the milk is first added to human milk, and the resulting mixture is introduced into the mixture of an epoxy resin with amine hardener in an amount ranging between 0.1 percent and 40 percent by volume of the mixture of an epoxy resin and a hardener.

2. The method according to claim 1, characterized in that before the milk is introduced into the mixture of an epoxy resin and an amine hardener, sodium bisulfate (IV) is added to it in an amount equal to at least 0.1 percent by weight of the milk.

3. The method according to claim 1, characterized in that before the milk is introduced into the mixture of an epoxy resin and an amine hardener, an amount of between 0.1 percent and 75 percent by weight of the milk is added to the milk.

4. The method according to claim 1, characterized in that the process is carried out at a temperature between 15 and 50° C.

5. The method according to claim 1, characterized in that the process of preparing a mixture of milk with a mixture of an epoxy resin and an amine hardener is carried out together with the addition of dispersant in an amount equal to 0.1 to 50% by volume of the mixture of an epoxy resin and hardener.

6. The method according to claim 5, characterized in that ethoxylated castor oil is used as the dispersant.

7. The method according to claim 1, characterized in that the epoxy resin hardening process is carried out at a pressure of between 0.5 and 50 bars.

8. The method according to claim 7, characterized in that after being filled, the mold is inserted into the autoclave.

* * * * *